United States Patent
Keithley

(10) Patent No.: US 8,289,599 B1
(45) Date of Patent: Oct. 16, 2012

(54) MECHANICAL GALVANOMETER TILT CORRECTION

(75) Inventor: Douglas G. Keithley, Boise, ID (US)

(73) Assignee: Marvell International Ltd. (BM)

( * ) Notice: Subject to any disclaimer, the term of this patent is extended or adjusted under 35 U.S.C. 154(b) by 705 days.

(21) Appl. No.: 11/958,092

(22) Filed: Dec. 17, 2007

Related U.S. Application Data

(60) Provisional application No. 60/871,031, filed on Dec. 20, 2006.

(51) Int. Cl.
*G02B 26/08* (2006.01)
(52) U.S. Cl. .................. 359/199.4; 359/224.1; 359/904
(58) Field of Classification Search .... 359/198.1–199.4, 359/200.6–200.8, 202.1, 221.2, 223.1–225.1, 359/226.2, 290, 838, 846, 871, 872; 250/204, 250/559.06; 347/255–260; 353/39, 98–99
See application file for complete search history.

(56) References Cited

U.S. PATENT DOCUMENTS

| | | | |
|---|---|---|---|
| 4,571,712 A | 2/1986 | Romano et al. | |
| 5,629,790 A * | 5/1997 | Neukermans et al. | 359/198.1 |
| 7,187,400 B2 | 3/2007 | Bush | |
| 7,245,412 B2 | 7/2007 | Bruland et al. | |
| 7,301,554 B2 | 11/2007 | Kubo | |
| 7,518,628 B2 | 4/2009 | Shukuya | |
| 2004/0119813 A1 | 6/2004 | Bush et al. | |
| 2004/0125193 A1 | 7/2004 | Kubo | |
| 2005/0213230 A1 * | 9/2005 | Mochizuki | 359/876 |
| 2006/0132880 A1 | 6/2006 | Amada et al. | |
| 2007/0127003 A1 * | 6/2007 | Aikawa | 355/53 |

* cited by examiner

Primary Examiner — Jennifer L. Doak

(57) ABSTRACT

A piezoelectric actuator corrects for imperfections in printed material caused by the vertical rotation of a photosensitive image forming surface, such as a photoconductive drum. The piezoelectric actuator may be mounted to the base of a reflective surface holder, such as a mirror holder, that holds a mirror. The reflective surface holder may be operable to horizontally rotate the mirror as the mirror reflects a laser onto the photosensitive image forming surface. A power supply in communication with the piezoelectric actuator applies a voltage to the piezoelectric actuator. The resulting voltage allows the piezoelectric actuator to tilt the mirror in a vertical direction. A memory storage device may store tilt adjustment data usable by a microprocessor or controller to control the amount of voltage the power supply supplies to the piezoelectric actuator.

23 Claims, 8 Drawing Sheets

MECHANICAL GALVANOMETER TILT CORRECTION

CROSS-REFERENCE TO RELATED APPLICATION

This application claims the benefit of U.S. Provisional Application No. 60/871,031 filed Dec. 20, 2006.

BACKGROUND

This application relates to correcting tilt caused by a mechanical galvanometer. In particular, this application relates to a piezoelectric actuator used to correct vertical tilt caused by the rotation of a mechanical galvanometer and the rotation of a photoconductive drum.

Galvanometer use in laser printers has recently increased. A laser printer using a single galvanometer will often have a light reflecting mirror mounted to the galvanometer. The laser printer uses a light source that generates a light beam, which is reflected by the mirror onto a photo-sensitive image forming surface, such as the surface of a photoconductive drum. As the light beam is reflected onto the surface of the photoconductive drum, the galvanometer horizontally rotates the mirror across the photo-sensitive image forming surface. The rotation of the mirror, and the resulting movement of the light beam across the photo-sensitive image forming surface, produces forward-going and reverse-going scanlines.

However, while the galvanometer is horizontally rotating the mirror, the photoconductive drum is rotating vertically. Due to the movements of both the galvanometer and the photoconductive drum, the resulting forward-going and reverse-going scanlines are often vertically tilted. Although some laser printers may use a second galvanometer to vertically rotate the mirror to correct for this tilt, these laser printers use the second galvanometer assuming that the mirror requires the same vertical rotation as it does horizontally. Furthermore, using a second galvanometer requires a complex control system, including additional magnets and control coils, which increases the cost to manufacture a laser printer significantly.

SUMMARY

The present invention is defined by the following claims, and nothing in this section should be taken as a limitation on those claims.

By way of introduction, the preferred embodiments described below provide a piezoelectric actuator in communication with a mirror to vertically tilt the mirror. In one preferred embodiment, a single piezoelectric actuator is in communication with the base of the mirror. In another preferred embodiment, two piezoelectric actuators are in communication with the mirror. Other preferred embodiments are provided, and each of the preferred embodiments described herein can be used alone or in combination with one another.

The preferred embodiments will now be described with reference to the attached drawings.

DETAILED DESCRIPTION OF THE PRESENTLY PREFERRED EMBODIMENTS

Figure 1:
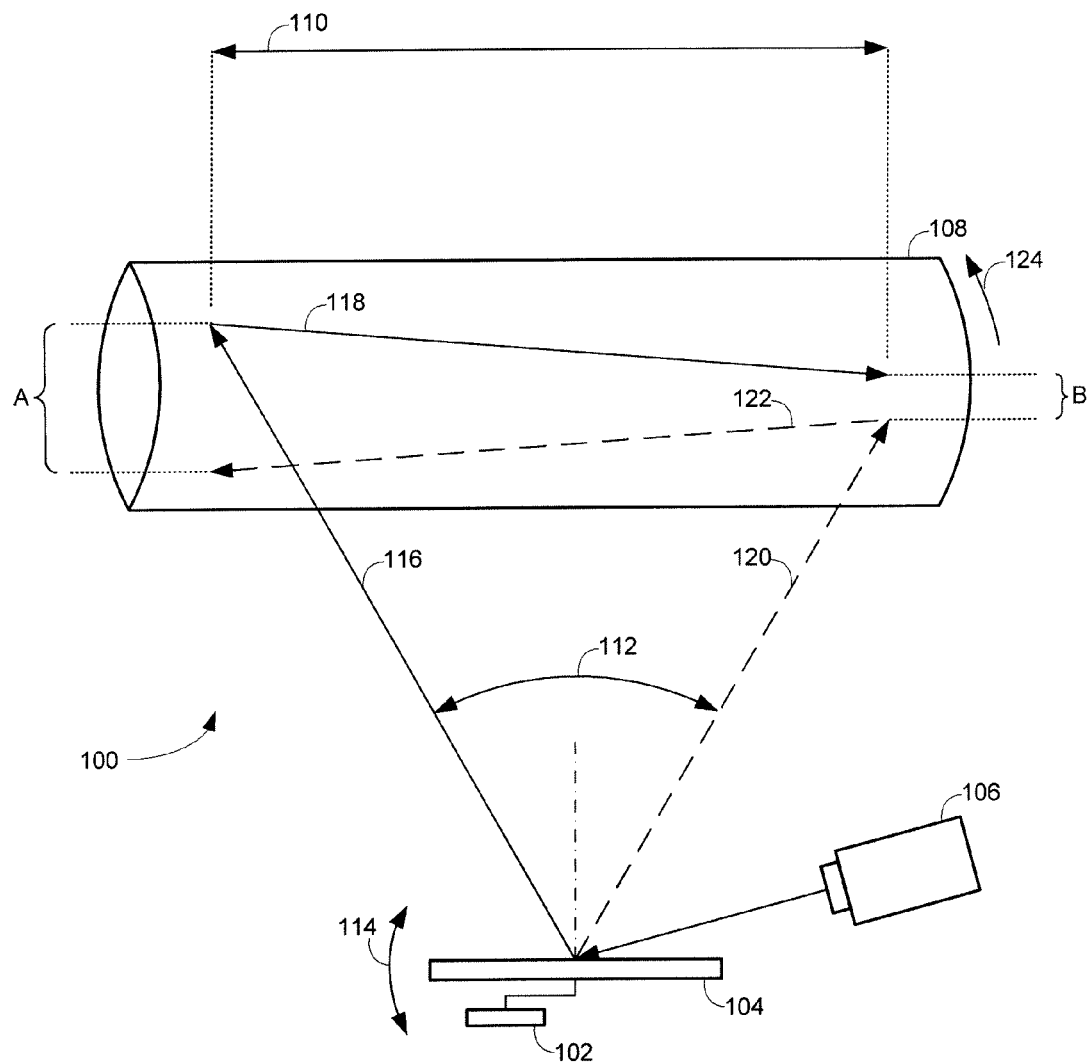
FIG. 1 is a functional block diagram of an image forming system using a single galvanometer.

FIG. 1 is a functional block diagram of an image forming system 100. The image forming system 100 includes a galvanometer 102 in communication with a mirror 104. A light source 106 generates a light beam that is reflected by the mirror 104 onto an image forming surface, such as the surface of a photoconductive drum 108. As used herein, a mirror is meant to include any type of surface that can reflect light. As one example, a surface of the galvanometer 102 may be polished, and the polished surface of the galvanometer 102 may reflect the light beam. However, other surfaces may be used as a mirror to reflect the light beam. In general, a light beam may be visible light, infrared light, a laser, a stream of electrons, electromagnetic radiation ranging in wavelength from about 400 nm to 700 nm, any other type of light now known or later developed, or combinations thereof.

The galvanometer 102 may horizontally rotate the mirror 104 about a central axis, such that the axis is perpendicular with respect to the surface plane of FIG. 1. The horizontal rotation of the mirror 104 is depicted by a mechanical displacement angle 114. The mechanical displacement angle 114 may include any range of angles from 0° through 180°, inclusive. As the mirror 104 rotates, the mirror 104 sweeps the light beam across the surface of the photoconductive drum 108. In one implementation the light beam sweeps through the arc depicted by the angle 112, including reflected light beam 116 and reflected light beam 120. Angle 112 represents an angle of deflection. Angle 112 may include any range of angles from 0° through 180°, inclusive. In one implementation, the change in the mechanical displacement angle 114 of mirror 104 causes twice the change in the deflected angle 112. For example, a 10° change in the mechanical displacement angle 114 may cause a 20° change in the deflected angle 112.

The arrangement of the components shown in FIG. 1, including the galvanometer 102, the mirror 104, and the photoconductive drum 108, does not limit the possible arrangements of those components. Alternative arrangements are also possible. For example, the arrangement of FIG. 1 may also include one or more optical lenses (not shown). In one implementation, the optical lenses shape the light beam. However, the optical lenses may also focus or adjust the velocity of the light beam. Although not shown, the optical lenses may be located in several places between the light source 106 and the photoconductive drum 108.

FIG. 1 further shows that, in one implementation, the galvanometer 102 causes the mirror 104 to reflect the light beam from light source 106 in a forward-going direction and a reverse-going direction. For example, the solid lines illustrate a first horizontal scanning direction as the galvanometer 102 rotates clockwise. Thus, clockwise rotations of the galvanometer 102 may include one or more forward-going scanlines depicted by scanline 118. Similarly, after the galvanometer 102 has reached the maximum point of clockwise rotation, such as 28°, the galvanometer 102 begins to rotate in a counter-clockwise direction. The dashed lines of FIG. 1 illustrate a second horizontal scanning direction caused by the galvanometer 102 rotating the mirror 104 counter-clockwise. The second horizontal scanning direction may include one or more reverse-going scanlines. For example, one or more reverse-going scanlines are depicted by reverse-going scanline 122. When the galvanometer 102 has reached the maximum point of counter-clockwise rotation, such as −28°, the galvanometer 102 then rotates again in the clockwise direction.

The forward-going scanlines 118 and the reverse-going scanlines 122 define an image area 110 on the surface of the photoconductive drum 108. Alternatively, the image area 110 may be defined by the beginning and end of a forward-going scanline 118, the beginning and end of a reverse-going scanline 122, or combinations thereof. The image area 110 may also include only forward-going scanlines 118, only reverse-going scanlines 122, or combinations thereof.

In one implementation, the mirror 104 is configured to rotate through a mechanical displacement angle 114 of 28°. That is, the rotation of the mirror 104 causes a deflected angle 112 of 56°. Assuming that the image forming system 100 is configured to produce 600 dots per inch (DPI) on an 8.5" sheet of print media, the forward-going scanlines 118 may produce approximately 5,100 dots (or pixels) on the surface of the photoconductive drum 108. Similarly, the reverse-going scanlines 122 may also produce 5,100 dots (or pixels) on the surface of the photoconductive drum 108. Accordingly, 91 pixels per degree of deflected angle 112 are produced as the mirror 104 rotates and reflects light beams 116,120 onto the surface of the photoconductive drum 108. Similarly, and in another example, assuming 1200 DPI and an 8.5" sheet of print media, 182 pixels per degree of deflected angle 112 are produced as the mirror 104 rotates and reflects light beams 116,120 onto the surface of the photoconductive drum 108.

During the clockwise and counter-clockwise rotations of the galvanometer 102, the photoconductive drum 108 is also rotating. The rotational movement of the photoconductive drum 108 facilitates the formation of a latent image on the photoconductive drum 108 from one or more forward-going scanlines 118, one or more reverse-going scanlines 122, or combinations thereof. The latent image may then attract an image-forming material, such as toner, and the image-forming material may then be transferred to print media. In one implementation, the photoconductive drum 108 may rotate vertically upwards as shown by rotational movement 124.

The rotational movement 124 of the photoconductive drum 108 causes vertical tilt in the forward-going scanlines 118 and the reverse-going scanlines 122. For example, rather than forming parallel forward-going scanlines 118 and reverse-going scanlines 122 on the surface of the photoconductive drum 108, the image forming system 110 may form forward-going scanlines 118 and reverse-going scanlines 122 that are convergent, divergent, or combinations thereof. The vertical tilt caused by the rotational movement 124 impacts the resulting printed image because the latent image on the photoconductive drum 108 will have imperfect scanlines. The imperfect scanlines on the latent image thus produces a printed image having varied darker and lighter print patterns across the printed page.

In FIG. 1, the vertically tilted distance between the start of a first forward-going scanline 118 and the end of a first reverse-going scanline 122 is depicted by distance A. Distance A may be measured in pixels, scanlines, any now known or later developed method of measurement, or combinations thereof. Similarly, the vertically tilted distance from the end of the first forward-going scanline 118 and the start of a first reverse-going scanline 122 is depicted by distance B. Distance B may be measured in pixels, scanlines, any now known or later developed method of measurement, or combinations thereof. For example, distance A may be measured as 1.5 scanlines and distance B may be measured as 0.5 scanlines.

The rotational movement 124 of the photoconductive drum 108 may produce sets of forward-going scanlines 118 and reverse-going scanlines 122 separated by the distance B. A set of scanlines is one forward-going scanline 118 and one reverse-going scanline 112. Accordingly, in one implementation without corrective measures where a galvanometer 102 is configured to rotate both clockwise and counter-clockwise, each set of scanlines 112 and 118 are separated by the distance B. In this implementation, the image forming system 100 continuously repeats sets of scanlines 118 and 122 when forming an image on print media.

In controlling the galvanometer 102, the image forming system 100 may use one or more components as described in U.S. patent application Ser. No. 11/956,958, titled "Mechanical Galvanometer Tilt Correction Control", filed Dec. 14, 2007, which is incorporated by reference in its entirety.

Figure 2:
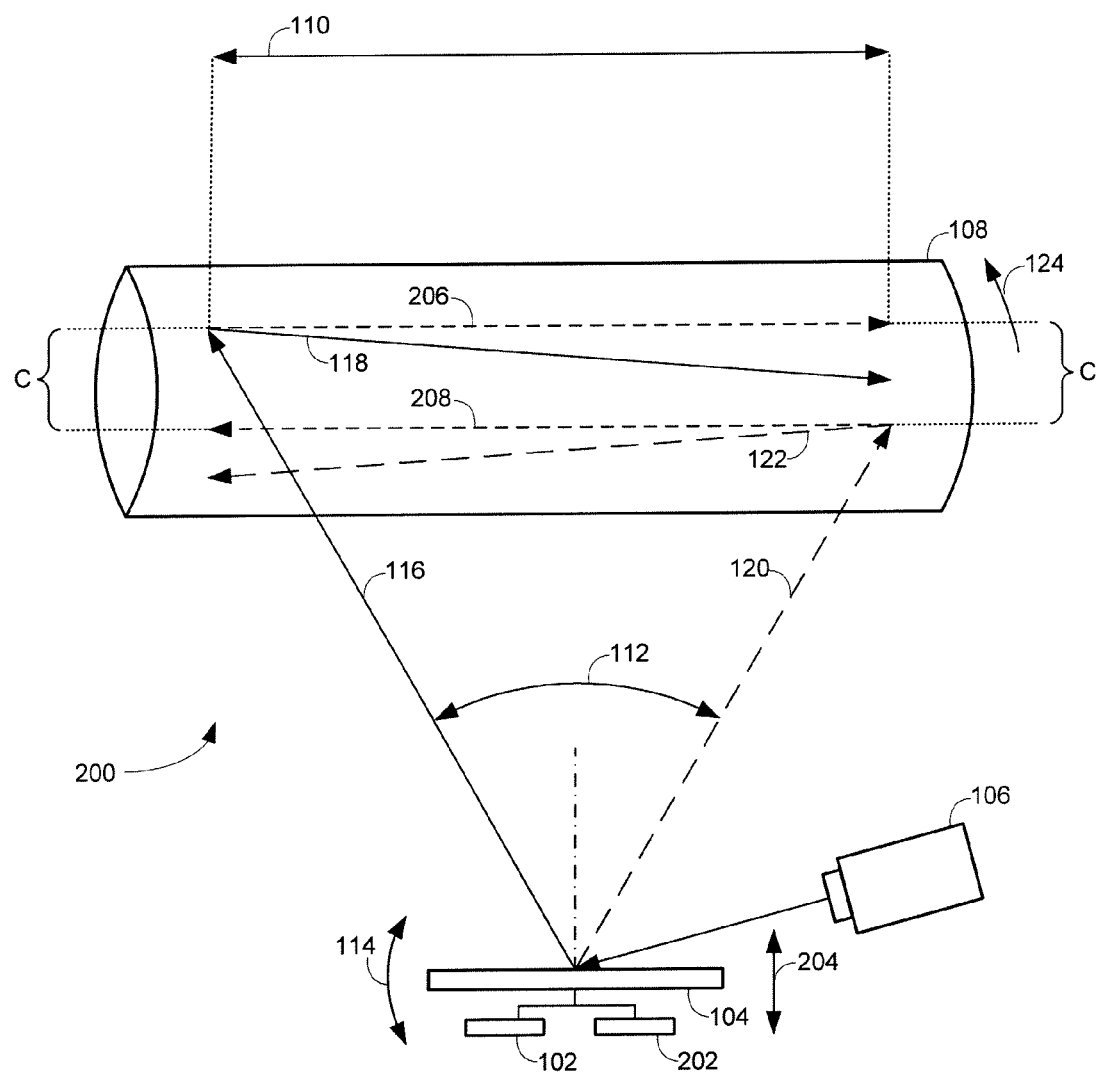
FIG. 2 is a functional block diagram of an imaging forming system using a piezoelectric actuator supplied with voltage of a preferred embodiment.

FIG. 2 is a functional block diagram of an imaging forming system 200 using a piezoelectric actuator 202 supplied with a voltage to correct for the vertical tilt caused by the rotational movement 124 of the photoconductive drum 108. The piezoelectric actuator 202 may be in communication with the mirror 104, the galvanometer 102, any other components of the image forming system 200, or combinations thereof. The piezoelectric actuator 202 may also be in communication with a power supply (not shown) that supplies a voltage to the piezoelectric actuator 202. One implementation of the piezoelectric actuator 202 in communication with a power supply is discussed further below with reference to FIG. 7. The arrangement of the components shown in FIG. 2, including the galvanometer 102, the mirror 104, the photoconductive drum 108, and the piezoelectric actuator 202, does not limit the possible arrangements of those components. Alternative arrangements are also possible.

In one implementation, the piezoelectric actuator 202 is operable to vertically mechanically tilt the mirror 104 in a first vertical scanning direction in response to a supplied voltage. In general, a vertical scanning direction refers to the vertical direction of the reflected light beam as the reflected light beam sweeps across, either in a forward-going direction or reverse-going direction, the surface of the photoconductive drum 108. The mechanically tilting movement of the mirror 104 caused by the piezoelectric actuator 202 is depicted by the mechanical displacement angle 204. The mechanical displacement angle 204 may include any range of angles, such as −180° through 180°, inclusive. The mechanical displacement angle 204 may also be predetermined, computed by a microprocessor (not shown), determined using a look-up table, preprogrammed, based on any other now known or later developed adjusting techniques, or combinations thereof.

The mechanical displacement angle 204 may also be based on the rotational movement 124 of the photoconductive drum 108, the amount of vertical tilting caused by the forward-going scanlines 118 or the reverse-going scanlines 122, the horizontal rotation of the galvanometer 102, or combinations thereof. For example, where the image forming system 200 is set to produce 600 DPI using forward-going scanlines 118 and reverse-going scanlines 122, the amount of tilt to correct the imperfections of the forward-going scanlines 118 and reverse-going scanlines 122 may be +/−¼ pixel. In terms of degrees, a ¼ pixel may be equal to 0.0025° of vertical beam deflection. In addition, the amount of vertical deflection may correspond to twice the amount of vertical mechanical displacement by the piezoelectric actuator 204. Accordingly, in terms of vertical mechanical displacement, the mechanical displacement angle 204 may include a vertical tilt range of 0.0025°. Thus, in one implementation, the piezoelectric actuator 202 vertically mechanically tilts the mirror 104 from −0.00125° to +0.00125° when the forward-going scanlines 118 are produced. After the forward-going scanlines 118 are produced, the piezoelectric actuator 202 mechanically tilts the mirror 104 back to −0.00125° before the reverse-going scanlines are produced. The piezoelectric actuator 202 then mechanically tilts the mirror 104 from −0.00125° to +0.00125° when the reverse-going scanlines 122 are produced. In other words, in this implementation, the mirror is tilted by the same amount of vertical deflection for each scan direction for the corrections shown in FIG. 2. In this manner, the vertical mechanical tilt of the mirror 104 facilitates the production of scanlines 118 and 122 that are substantially parallel to each other on the surface of the photoconductive drum 108. However, depending on the amount of pixel error caused by the rotational movement 124 of the photoconductive drum 108, the mechanical displacement angle 204 may exhibit a range greater than 0.005°.

In vertically tilting the mirror 104, the piezoelectric actuator 202 may be supplied different amounts of voltage at different rates. For example, the amount and rate of voltage supplied to the piezoelectric actuator 202 may be dependent on the frequency response of the piezoelectric actuator 202 to changes in voltage. In one implementation, the voltage supplied to the piezoelectric actuator 202 elicits a linear mechanical response from the piezoelectric actuator 202. As different piezoelectric materials respond differently to voltages, the voltage supplied to the piezoelectric actuator 202 may be linear voltage, oscillating voltage, or combinations thereof. Although a supplied voltage may be used to physically deform the piezoelectric actuator 202, the piezoelectric actuator 202 may also rely on its own natural discharge properties to return to a relaxed state.

FIG. 2 shows eliciting a substantial linear mechanical response from the piezoelectric actuator 202 using a supplied voltage, and the effects of eliciting a substantial linear mechanical response from the piezoelectric actuator 202 on the forward-going scanlines 118 and reverse-going scanlines 122. When the light beam from the light source 106 strikes the mirror 104, the galvanometer 102 horizontally rotates the mirror 104 in a first horizontal scanning direction and the piezoelectric actuator 202 tilts the mirror 104 along a first vertical scanning direction. As the galvanometer 102 horizontally rotates the mirror 104 and the light beam is reflected onto the surface of the photoconductive drum 108, voltage is supplied to the piezoelectric actuator 202. In this implementation, the supplied voltage causes the piezoelectric actuator 202 to vertically tilt the mirror 104 at a substantially linear rate along a first vertical scanning direction such that corrected forward-going scanlines 206 are produced instead of the uncorrected forward-going scanlines 118. The titling of the mirror 104 along the first vertical scanning direction may or may not occur at the same instance the galvanometer 102 begins horizontally rotating the mirror 104. For example, the piezoelectric actuator 202 may tilt the mirror 104 before, after, or while the galvanometer 102 is rotating the mirror 104.

When the galvanometer 102 reaches its rotational angular limit, the supplied voltage to the piezoelectric actuator 202 may change, causing the piezoelectric actuator 202 to return to its original state. Examples of changing the supplied voltage include increasing the amount of voltage, decreasing the amount of voltage, changing the rate in which the voltage is supplied, not supplying voltage to the piezoelectric actuator 202, or combinations thereof. Returning the piezoelectric actuator 202 to its original state further causes the mirror 104 to return its untilted state, that is, the state before the galvanometer 102 began horizontally rotating the mirror 104. The galvanometer 102 then begins horizontally rotating the mirror 104 in a second horizontal scanning direction, which may be opposite to the direction of the first horizontal scanning direction. The voltage supplied to the piezoelectric actuator 202 may then change again, which causes the piezoelectric actuator 202 to vertically tilt the mirror 104 in a second vertical scanning direction at a substantially linear rate. The second vertical scanning direction of the mirror 104 may be the same, substantially similar, or different from the first vertical scanning direction. As the galvanometer 102 horizontally rotates the mirror 104 in the second horizontal scanning direction and the light beam is reflected onto the surface of the photoconductive drum 108, the voltage supplied to piezoelectric actuator 202 may be adjusted to maintain a linear mechanical response from the piezoelectric actuator 202. The linear mechanical response of the piezoelectric actuator 202 facilitates the tilt of the mirror 104 along the second vertical scanning direction such that corrected reverse-going scanlines 208 are produced rather than the uncorrected reverse-going scanlines 122. This process of creating corrected forward-going scanlines 206 and reverse-going scanlines 208 may be repeated continuously until the image forming system 200 no longer requires additional scanlines.

FIG. 2 further shows the distance C between corrected forward-going scanlines 206 and reverse-going scanlines 208. In contrast to the distances A and B, the distance C may be substantially equidistant at the end of a corrected forward-going scanline 206 and the start of a corrected reverse-going scanline 208, and at the end of a corrected reverse-going scanline 208 and the start of a corrected forward-going scanline 206. Hence, the corrected forward-going scanlines 206 may be substantially parallel to the corrected reverse-going scanlines 208. In one implementation, the distance C may be equal to about one scanline. However, it is also possible that the distance C is equal to more than one scanline or less than one scanline.

Figure 3:
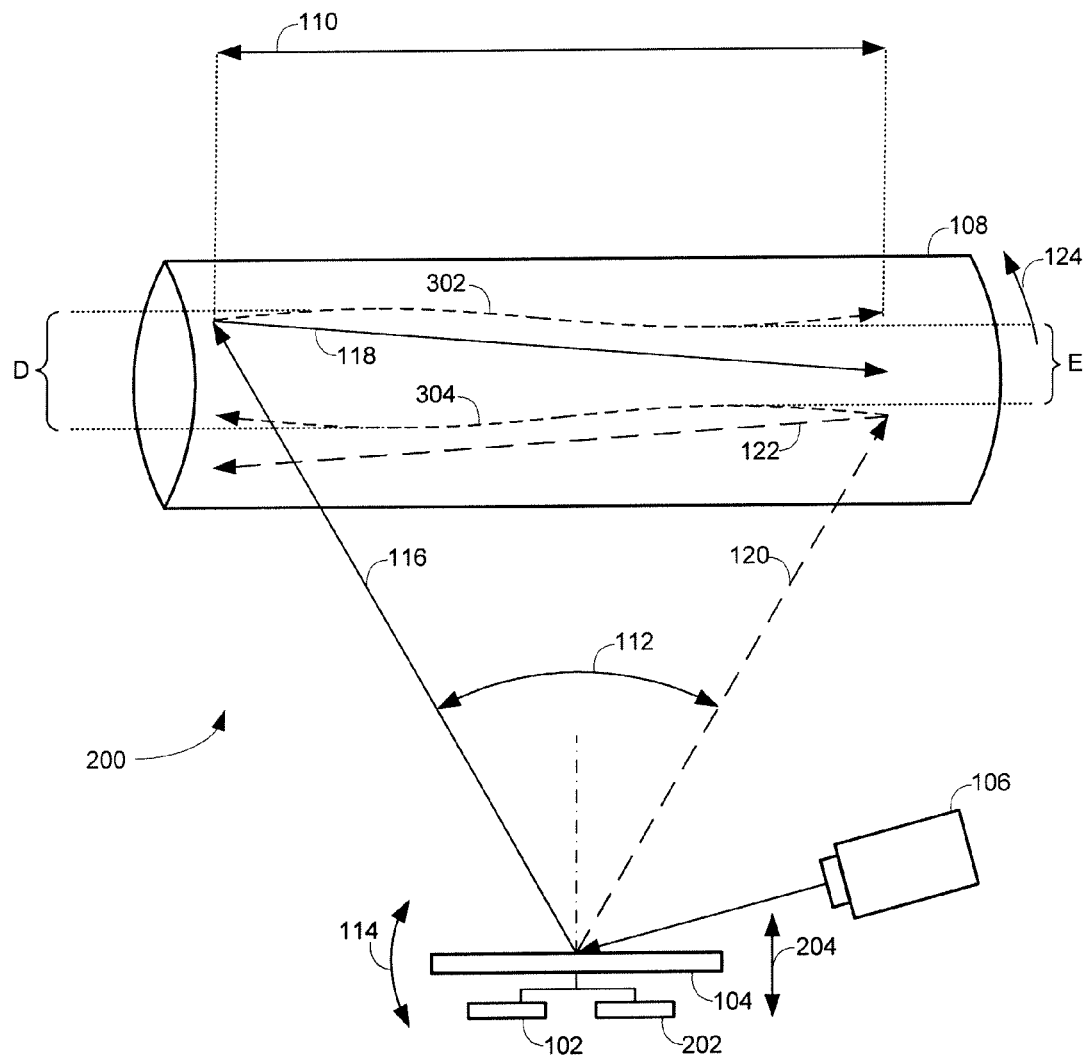
FIG. 3 is a functional block diagram of the imaging forming system of FIG. 2 using a piezoelectric actuator supplied with voltage of another preferred embodiment.

FIG. 3 is a functional block diagram of the imaging forming system 200 of FIG. 2 where the piezoelectric actuator 202 is supplied with oscillating voltage of another preferred embodiment. Like FIG. 2, the arrangement of the components shown in FIG. 3, including the galvanometer 102, the mirror 104, the photoconductive drum 108, and the piezoelectric actuator 202, does not limit the possible arrangements of those components. Alternative arrangements are also possible.

In one implementation of the image forming system 100, voltage is supplied to the piezoelectric actuator 202 such that the piezoelectric actuator 202 exhibits a sinusoidal mechanical response. As shown in FIG. 3, the voltage supplied to the piezoelectric actuator 202 causes the mirror 104 to alternate between a maximum point and a minimum point along the first and second vertical scanning directions. For example, the application of the voltage to the piezoelectric actuator 202 may cause the mirror 104 to mechanically tilt in an alternating fashion between −0.00125° and 0.00125°. Where the piezoelectric actuator 202 exhibits a sinusoidal mechanical response, corrected forward-going scanlines 302 and reverse-going scanlines 304 are produced.

Furthermore, the corrected forward-going scanlines 302 and corrected reverse-going scanlines 304 may each be substantially similar to a sine wave and have a period of substantially 2π. As the corrected forward-going scanlines 302 and corrected reverse-going scanlines 304 may be similar to sine waves, the corrected forward-going scanlines 302 and corrected reverse-going scanlines 304 may be closer in distance at some points and further in distance at others. For example, distance D shows that the scanlines 302 and 304 may be further in distance at the peak of the scanline 302 and the valley of the scanline 304. Similarly, distance E shows that the scanlines 302 and 304 may be closer in distance at the valley of the scanline 302 and the peak of the scanline 304. In one implementation, the distance E may be approximately 0.94 scanlines in width and distance D may be approximately 1.06 scanlines in width. However, depending on the voltage supplied to the piezoelectric actuator 202, the distance E may be greater or less than 0.94 scanlines, and the distance D may be greater or less than 1.06 scanlines.

Figure 4:
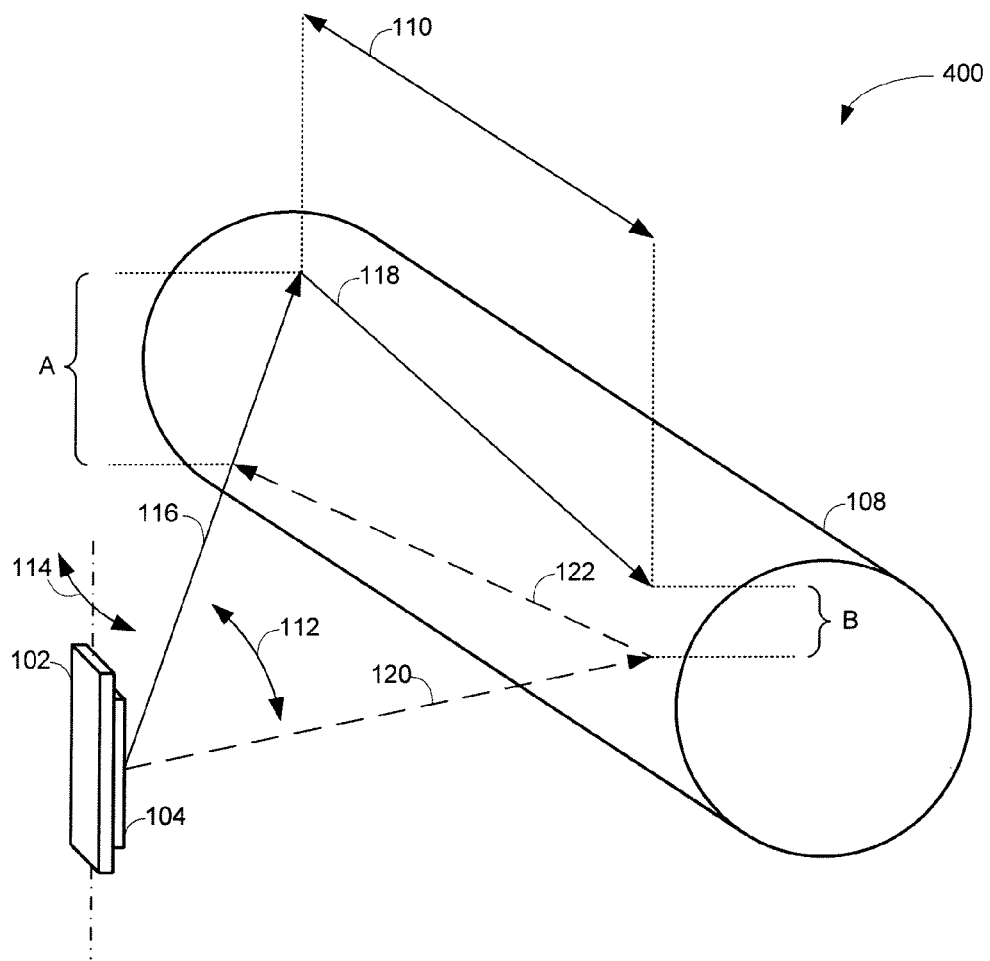
FIG. 4 is a perspective view of an image forming system using a single galvanometer.
Figure 5:
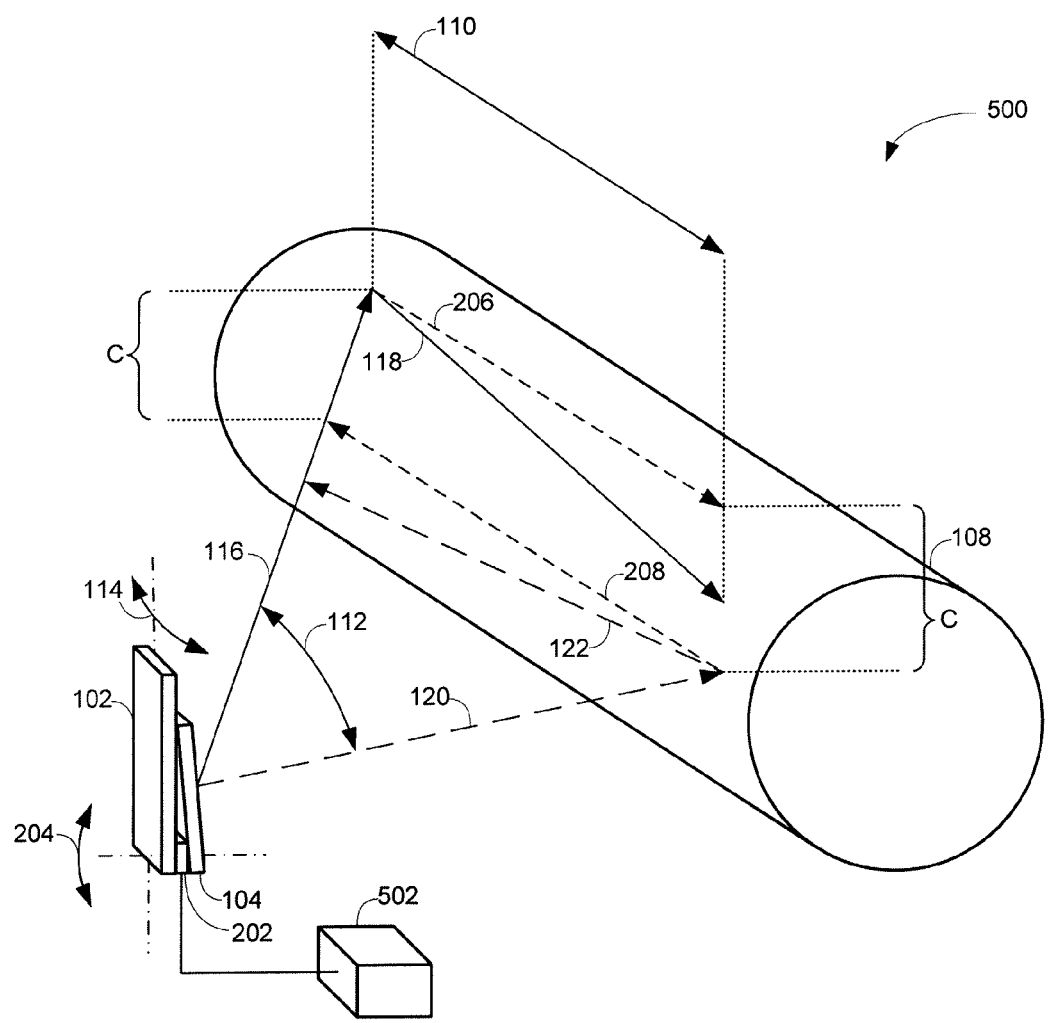
FIG. 5 is a perspective view of an image forming system using a piezoelectric actuator supplied with a voltage of a further preferred embodiment.
Figure 6:
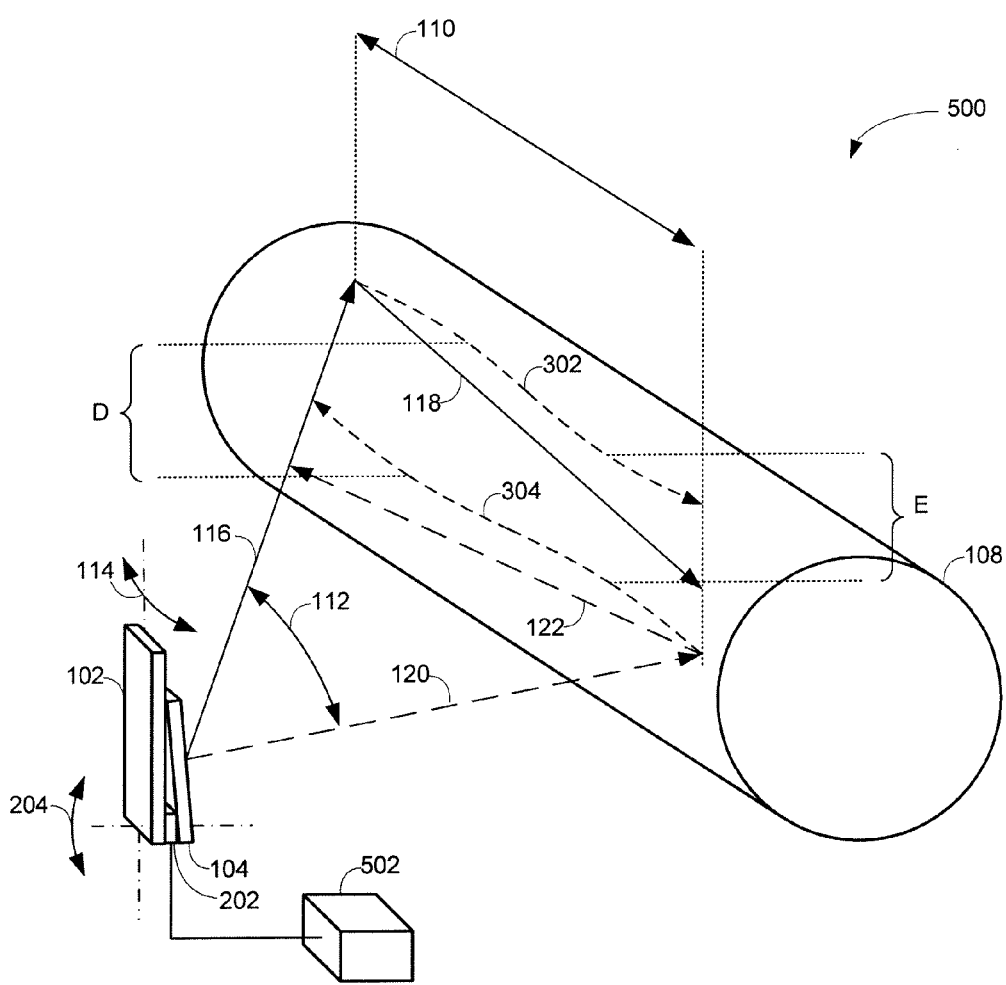
FIG. 6 is a perspective view of the imaging forming system of FIG. 5 using a piezoelectric actuator a voltage of another preferred embodiment.

Turning now to FIG. 4 is a perspective view of an image forming system 400 using a single galvanometer 102. Although FIG. 4 shows the mirror 104 separate from the galvanometer 102, the mirror 102 may be integrated with the galvanometer 102. FIG. 5 is a perspective view of an image forming system 500 where the piezoelectric actuator 202 exhibits a linear mechanical response from a supplied voltage of a further preferred embodiment. FIG. 6 is a perspective view of the imaging forming system 500 of FIG. 5 where the piezoelectric actuator 202 exhibits a sinusoidal mechanical response from a supplied voltage of another preferred embodiment. The components shown in FIGS. 4-6 may be similar to those shown in FIGS. 1-3. Hence, a review of the components previously discussed is omitted.

FIGS. 5-6 further show that in one implementation of an image forming system 500, the piezoelectric actuator 202 may be mounted to the base of the mirror 104. Alternatively, the piezoelectric actuator 202 may be mounted to the base of a mirror holder that holds the mirror 104. In yet another embodiment, the mirror 104 is an integral part of the galvanometer 102. In this embodiment, the mirror 104 is an integrated mirror and the piezoelectric actuator 202 moves a bit more than the mirror 104. In addition, where the mirror 104 is an integrated mirror, the piezoelectric actuator 202 may be mounted between the galvanometer 102 and a structure supporting the galvanometer 102. FIGS. 5-6 also show that a power supply 502 is in communication with the piezoelectric actuator 202 for supplying a voltage to the piezoelectric actuator 202. The power supply 502 may be a battery, an internal power supply of the image forming system 500, an external power source, any other now known or later developed device for supplying power, or combinations thereof. In one implementation, the voltage supplied by the power supply 502 is adjustable or varied.

Figure 7:
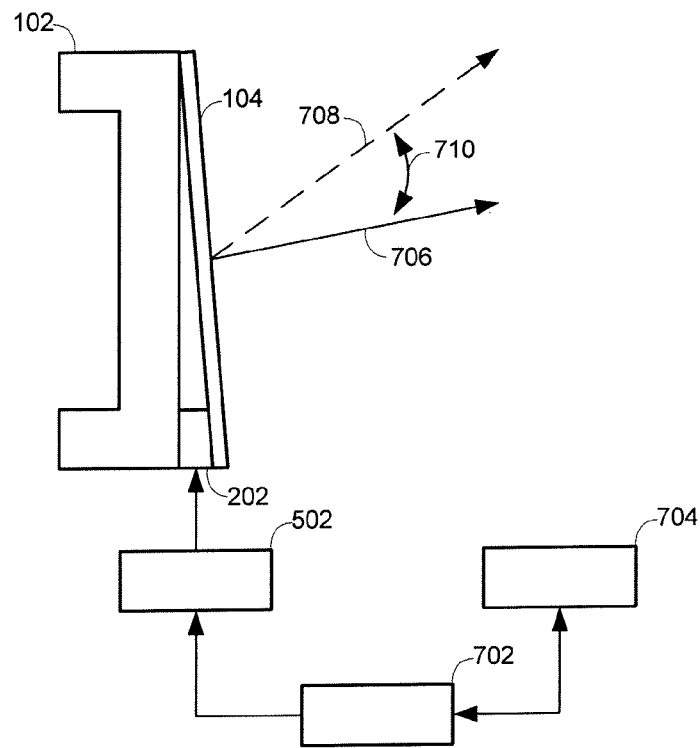
FIG. 7 is a functional block diagram of a single piezoelectric actuator in communication with a mirror of an additional preferred embodiment.

FIG. 7 is a functional block diagram of a single piezoelectric actuator 202 in communication with a mirror 104 of an additional preferred embodiment. In FIG. 7, the mirror 104 is in communication with the galvanometer 102, and the piezoelectric actuator 202 is mounted at the base of the galvanometer 102 in-between the galvanometer 102 and the mirror 104. However, mounting the piezoelectric actuator 202 at the base of the galvanometer 102 is only one possible implementation.

For example, the piezoelectric actuator 202 may be mounted at the top of the galvanometer or in another mounting location.

FIG. 7 also shows a controller 702 in communication with the power supply 502 and a memory storage device 704. The controller 702 may be a general processor, a data signal processor, graphics card, graphics chip, personal computer, motherboard, memories, buffers, scan converters, filters, interpolators, field programmable gate array, application-specific integrated circuit, analog circuits, digital circuits, combinations thereof, or any other now known or later developed processor. Alternatively, or in addition, the controller 702 may be software written in a computer programming language. The memory storage device 704 may be random access memory, cache memory, dynamic random access memory, static random access memory, flash memory, virtual memory, video memory, magnetic memory, optical memory, any known or later developed memory technology, or combinations thereof.

The memory storage device 704 is operable to store tilt adjustment data. The controller 702 may be operable to control the voltage supplied to the piezoelectric actuator 202 by the power supply 502 using the tilt adjustment data. In one implementation, tilt adjustment data includes data relating to the amount of voltage to apply to the piezoelectric actuator to tilt the mirror in the first vertical scanning direction. Alternatively, or in addition, the tilt adjustment data may further include data based on the rotational movement 124 of the photoconductive drum 108. The tilt adjustment data may be predetermined, may be calculated, or combinations thereof. The memory storage device 704 may be preprogrammed with the tilt adjustment data in the form of a look-up table such that entries in the table correspond to the amount of voltage to supply to the piezoelectric actuator 202 based on inputs of the rotational movement 124 of the photoconductive drum 108 and the horizontal rotation of the galvanometer 102. Alternatively, the tilt adjustment data may be calculated and stored by the controller 702 based on one or more inputs, such as the rotational movement 124 of the photoconductive drum 108. In yet a further embodiment, a horizontal synchronization signal may be used to generate the timing for the horizontal rotation of the galvanometer 102 or control the voltage supplied to the piezoelectric actuator 202. An example of a horizontal synchronization signal is a beam detect signal that indicates a beam is detected at a certain location.

In one implementation, without the application of the piezoelectric actuator 202, the mirror 104 reflects an uncorrected light beam 706. An angle of correction used to correct for the uncorrected light beam 706 is depicted by angle 710. Angle 710 may include −180° through 180°, inclusive. Angle 710 may also include smaller angles. For example, angle 710 may be equal to about 0.005°. As previously discussed, an angle of 0.005° may be used to correct for vertical tilting caused by the rotational movement 124 of the photoconductive drum 108. To vertically tilt the mirror 104 through the angle 710, the controller 702 uses the tilt adjustment data from the memory storage 704 to control the voltage supplied to the piezoelectric actuator 202 by the power supply 502. The controller 702 may control the amount of voltage supplied to the piezoelectric actuator 202, the rate at which voltage is supplied to the piezoelectric actuator, or combinations thereof.

Figure 8:
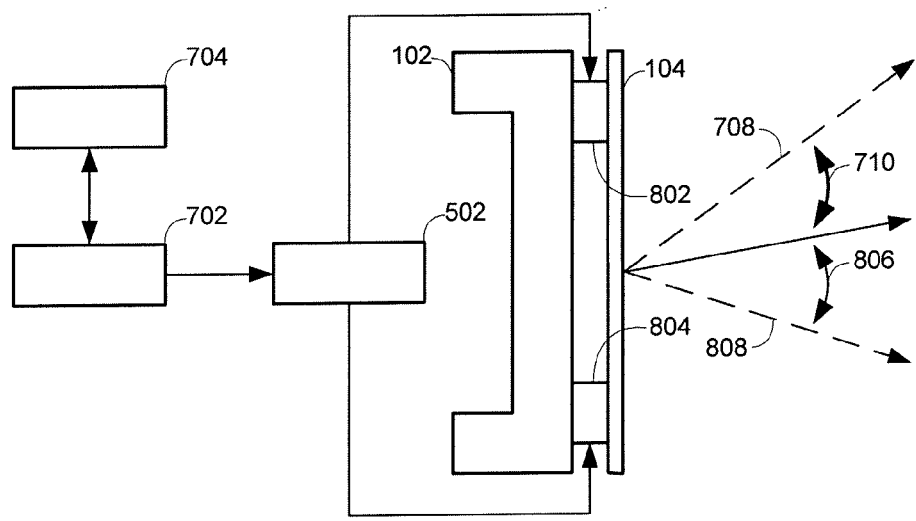
FIG. 8 is a functional block diagram of two piezoelectric actuators in communication with a mirror of an alternative preferred embodiment.

FIG. 8 is a functional block diagram of two piezoelectric actuators 802 and 804 in communication with a mirror 104 of an alternative preferred embodiment. As shown in FIG. 8, the piezoelectric actuator 802 is mounted to the top of the galvanometer 102 and in-between the galvanometer 102 and the mirror 104. The piezoelectric actuator 804 is mounted to the base of the galvanometer 102 and in-between the galvanometer 102 and the mirror 104. The power supply 502 is in communication with the piezoelectric actuators 802 and 804, and is operable to supply a voltage to both the piezoelectric actuators 802 and 804. In one implementation, the controller 702 may control the voltage supplied by the power supply 502 using the tilt adjustment data stored by the memory storage device 704. In one implementation, the tilt adjustment data includes data on supplying voltage to the actuator 802, the actuator 804, or combinations thereof.

The use of piezoelectric actuators 802 and 804 facilitate mechanically tilting the mirror 104. In mechanically tilting the mirror 104, the corrected light beam 708 sweeps through the deflection angle 710 and the corrected light beam 808 sweeps through the deflection angle 806. The piezoelectric actuators 802 and 804 may be activated simultaneously, alternatingly, or combinations thereof. For example, the non-activation of the piezoelectric actuator 802, and the activation of the piezoelectric actuator 804 may cause the mirror to tilt upwards, causing the corrected light beam to sweep through the deflection angle 710. Similarly, the non-activation of the piezoelectric actuator 804, and the activation of the piezoelectric actuator 802 may cause the mirror tilt downwards, which then causes the corrected light beam 808 to sweep through the deflection angle 806. For example, the piezoelectric actuator 804 may be activated for forward-going scanlines and the piezoelectric actuator 802 may be activated for reverse-going scanlines. However, it is possible that both the piezoelectric actuators 802 and 804 are activated simultaneously to tilt the mirror 804 through to produce alternative corrected light beams or scanlines.

Figure 9:
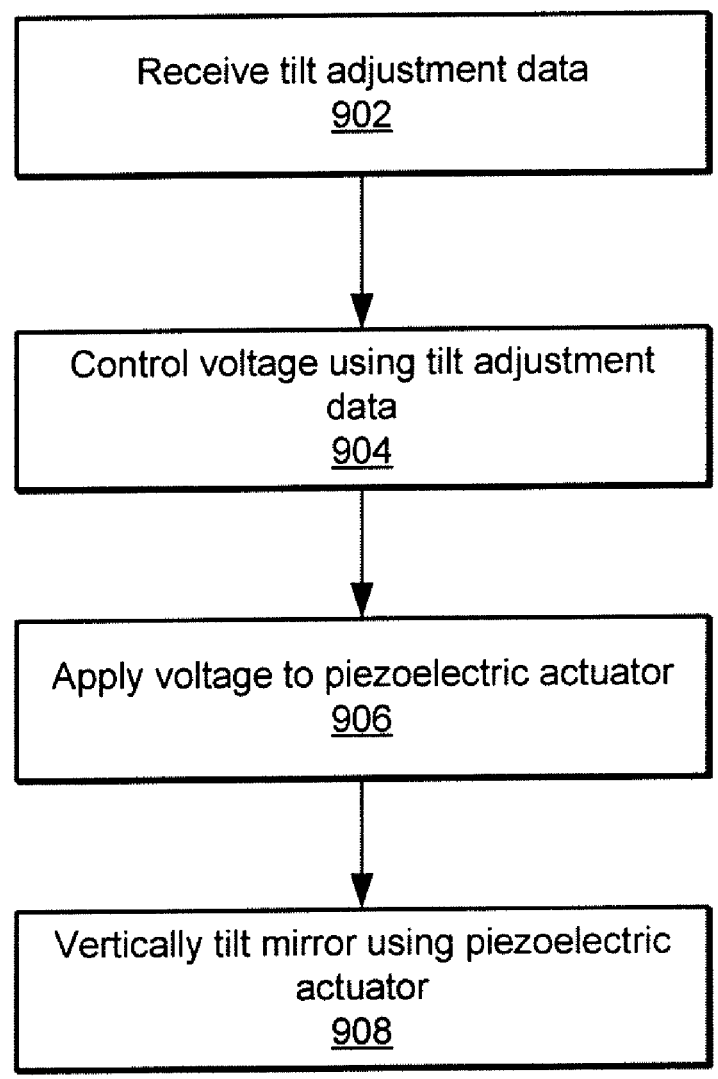
FIG. 9 is a flowchart of a method for vertically tilting a mirror using a piezoelectric actuator.

FIG. 9 is a flowchart of a method for vertically titling a mirror using one or more piezoelectric actuators. Initially, the galvanometer 102 begins to horizontally rotate the mirror 104. Before or while the galvanometer 102 is horizontally rotating the mirror 104, the controller 702 access and receives the tilt adjustment data from the memory storage device 704 (Act 902). The controller 702 then uses the tilt adjustment data to adjust the voltage supplied by the power supply 502 (Act 904). For example, the controller 702 may increase, decrease, or combinations thereof, the voltage supplied to the piezoelectric actuator 202 by the power supply 502. In one implementation, the controller 702 uses the tilt adjustment data to supply a voltage that causes a substantially linear mechanical response by the piezoelectric actuator 202 while the galvanometer 102 horizontally rotates the mirror 104. Alternatively, the controller 702 uses the tilt adjustment data to supply voltage to the piezoelectric actuator 202 (Act 906) that causes a substantially sinusoidal mechanical response in the piezoelectric actuator 202. In another implementation, the voltage may be supplied to the piezoelectric actuators 802 and 804. The voltage supplied to the piezoelectric actuators 802 and 804 then causes the piezoelectric actuators 802 and 804 to vertically tilt the mirror 104 (Act 908). Vertically tilting the mirror 104 may include vertically tilting at a substantially linear rate, an oscillating rate, any other rate, or combinations thereof. The vertically tilted mirror 104 then produces one or more scanlines that have been corrected for vertical tilting caused by the rotational movement 124 of the photoconductive drum 108.

It is intended that the foregoing detailed description be understood as an illustration of selected forms that the invention can take and not as a definition of the invention. It is only the following claims, including all equivalents, that are intended to define the scope of this invention.

What is claimed is:

1. A mechanical galvanometer tilt correction system comprising:
   a mirror operable to reflect a light beam onto a rotating photoconductive drum;
   a galvanometer in communication with the mirror and operable to move the mirror in a first horizontal scanning direction;
   a memory configured to store tilt adjustment data to compensate at least in part for movement of the rotating photoconductive drum;
   a piezoelectric actuator in communication with the mirror and operable to move the mirror in a first vertical scanning direction based on the tilt adjustment data in order to compensate at least in part for the movement of the rotating photoconductive drum; and
   a controller in communication with the memory operable to control a voltage supplied to the piezoelectric actuator using the tilt adjustment data to compensate at least in part for the movement of the rotating photoconductive drum.

2. The system of claim 1, where the piezoelectric actuator is operable to vertically tilt the mirror in the first vertical scanning direction while the galvanometer horizontally rotates the mirror in the first horizontal scanning direction.

3. The system of claim 1, where the piezoelectric actuator is further operable to vertically tilt the mirror at a substantially linear rate.

4. The system of claim 1, where:
   the first vertical scanning direction is defined by a minimum point and a maximum point; and,
   the piezoelectric actuator is further operable to vertically tilt the mirror between the minimum point and the maximum point of the first vertical scanning direction.

5. The system of claim 1, where:
   the galvanometer is further operable to horizontally rotate the mirror in a second horizontal scanning direction, the second horizontal scanning direction being in a direction opposite to the first horizontal scanning direction; and,
   the piezoelectric actuator is further operable to vertically tilt the mirror in a second vertical scanning direction, the second vertical scanning direction being substantially similar to the first vertical scanning direction.

6. The system of claim 1, where the tilt adjustment data comprises data relating to the amount of voltage to apply to the piezoelectric actuator to tilt the mirror in the first vertical scanning direction.

7. The system of claim 1, further comprising
   a laser configured to produce the light beam onto a rotatable photosensitive image forming surface of the rotating photoconductive drum; and,
   where the rotating photoconductive drum and laser are included in a printer.

8. The system of claim 1, where the supplied voltage causes a substantially linear response in the piezoelectric actuator.

9. The system of claim 1, where the supplied voltage causes a substantially sinusoidal response in the piezoelectric actuator.

10. A mechanical galvanometer tilt correction system comprising:
    means for reflecting a light beam;
    means for horizontally rotating the means for reflecting in a first horizontal scanning direction to define an image area on a rotating photoconductive drum using the light beam;

means for storing tilt adjustment data to at least in part compensate for movement of the rotating photoconductive drum; and means for vertically tilting the means for reflecting in a first vertical scanning direction to further define the image area on the rotating photoconductive drum using the light beam.

11. The system of claim 10, where the means for vertically tilting tilts the means for reflecting at a substantially linear rate.

12. The system of claim 10, where:

the first vertical scanning direction is defined by a minimum point and a maximum point; and, the means for vertically tilting tilts the means for reflecting between the minimum point and the maximum point of the first vertical scanning direction.

13. The system of claim 10, further comprising:

means for controlling a voltage supplied to the means for vertically tilting using the tilt adjustment data.

14. A method for correcting image misalignment from using a mechanical galvanometer comprising:

reflecting a light beam using a mirror onto a rotating photoconductive drum;

rotating the mirror in a first horizontal scanning direction to define an image area on the rotating photoconductive drum;

accessing tilt adjustment data from a memory, wherein the tilt adjustment data compensates, at least in part, for movement of the rotating photoconductive drum; and, tilting the mirror in a first vertical scanning direction according to the tilt adjustment data to further define the image area.

15. The method of claim 14, where vertically tilting the mirror in the first vertical scanning direction occurs while horizontally rotating the mirror in the first horizontal scanning direction.

16. The method of claim 14, where vertically tilting the mirror comprises vertically tilting the mirror at a substantially linear rate.

17. The method of claim 14, further comprising defining a first vertical scanning direction using a minimum point and a maximum point; and where:

vertically tilting the mirror comprises vertically tilting the mirror between the minimum point and the maximum point of the first vertical scanning direction.

18. The method of claim 14, further comprising:

measuring a rotation of a photosensitive image forming surface of the rotating photoconductive drum; and determining the first vertical scanning direction using the rotation of the photosensitive image forming surface and the first scanning direction.

19. The method of claim 14, further comprising:

horizontally rotating the mirror in a second horizontal scanning direction, the second horizontal scanning direction being in a direction opposite to the first horizontal scanning direction; and, vertically tilting the mirror in a second vertical scanning direction, the second vertical scanning direction being substantially similar to the first vertical scanning direction.

20. The method of claim 14, further comprising:

controlling an amount of voltage supplied by a power supply by using the tilt adjustment data to vertically tilt the mirror in the first vertical scanning direction.

21. The method of claim 20, further comprising:

measuring the rotation of the rotating photoconductive drum; and determining the tilt adjustment data based on the rotation of the rotating photoconductive drum.

22. The method of claim 20, where the mirror exhibits a substantially linear behavior when voltage is supplied by the power supply.

23. The method of claim 20, where the mirror exhibits a substantially sinusoidal behavior when voltage is supplied by the power supply.

* * * * *